Jan. 18, 1938.   A. W. TRONNIER   2,105,799
PHOTOGRAPHIC OBJECTIVE
Filed Aug. 31, 1935
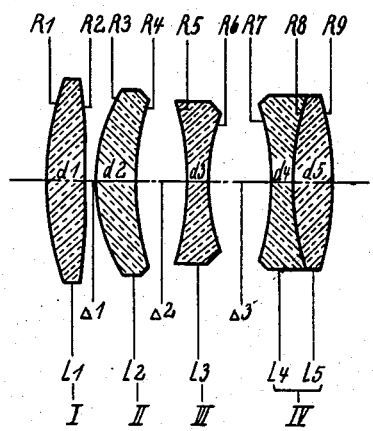
Inventor
Albrecht W. Tronnier
By Sommers & Young
Attys.

Patented Jan. 18, 1938

2,105,799

UNITED STATES PATENT OFFICE 2,105,799

PHOTOGRAPHIC OBJECTIVE

Albrecht Wilhelm Tronnier, Bad Kreuznach, Germany, assignor to the Corporation of Jos. Schneider & Co., Optotechnische Gesellschaft, Berlin, Germany Application August 31, 1935, Serial No. 38,816
In Germany January 15, 1935

1 Claim. (Cl. 88—57)

This invention relates to a photographic objective of four components in contact with the air, of the type disclosed in my copending application Ser. No. 38,815, and which has become U. S. Patent No. 2,076,686, dated April 13, 1937 wherein a single uncemented and asymmetric biconcave dispersive lens is disposed behind two separated collecting components arranged on the object side, while on the other side of this dispersive lens there is a cemented, meniscus-shaped collective component the collective cemented surface of which is concave toward the image side and the convex outer surface of which faces toward the image side. Such objective, with a relative opening of more than 1:3.5, permits attaining a good zone reductional correction within, as well as outside of, the axis over an image field of more than 50° to 60°, without it being necessary to use extremely great surface curvatures or particularly long paths of glass to attain this high degree of efficiency.

The present invention permits of an appreciable increase in the constructional length of such objectives with such correction of aberrational errors that within the aforesaid image field the positional aberrations of the sagital and meridional image surfaces may be kept below about 3/4% of the focal length, with such corrections of the spherical aberrations that their greatest zonal longitudinal error remains below about 3/8% of the focal length. By fully retaining these error limits the constructional length of the objective can be kept less than 3/8 of the focal length of the objective. This is accomplished by such distribution of the refractive effect among the two collective lenses, which precede the individually spatially disposed dispersing lenses, whose total focal length is at least 40%, and at most 80%, of the focal length of the entire objective, so that the rest effect $(\bar{\varphi}'_{V_I})$, consisting of the algebraic sum of the surface effects $(\Sigma \bar{\varphi}_F)$, each individual one of which $(\bar{\varphi}_{F_i})$ is equal to the product of the auxiliary radiation incidence height $(h_i)$, the refractory difference $(n'_i - n_i)$ and radii reverse value $(1:r_i)$, whereby the surface index is then designated by $i$, directed toward the front lens amounts to between 50 and 95% of the rest effect $(\bar{\varphi}'_{V_{II}})$ directed toward the collective member following the front lens, and whereby further, the focal length of the first collective member is per se smaller than the focal length of the complete objective.

The new objective is diagrammatically illustrated in the drawing, which shows a longitudinal section through an objective corresponding to the measurements of the following examples.

In the drawing the objective components as illustrated, may consist of a single collective lens I, a collective meniscus lens II, an unsymmetrical double concave dispersive lens III and a meniscus shaped doublet IV. Reference characters $d1$ to $d5$ designate the central thickness of the lenses, $\Delta 1$, $\Delta 2$, and $\Delta 3$, the air gaps and $R1$ to $R9$ the radii.

This surface effect $(\bar{\varphi}_{F_i})$ may be expressed as a formula thus:

$$(\bar{\varphi}_{F_i}) = \left(\frac{n'_i - n_i}{r_i} h_i\right)$$

Wherein $n'_i - n_i$ designates the difference of the refraction exponents of the adjacent media of these involved surfaces, $n_i$ designating the preceding and $n'_i$ the following medium. $r_i$ is the length of the radius of the corresponding surface $i$, while by the statement of the incidence height $h_i$ of the parallel auxiliary ray on the corresponding $i$ surface also clearly gives the position of this surface with respect to the preceding surfaces.

Since the rest effect $\bar{\varphi}'_V$ on a certain surface $i$ always is the sum of the preceding surface effects, it follows that:

$$\bar{\varphi}'_{V_{I,k}} = \sum_{i=1}^{k} \left(\frac{n'_i - n_i}{r_i} h_i\right)$$

wherein $l$ is the first surface of the system and $k$ the surface to be regarded as straight, for example, the surface R2 of the formula $\bar{\varphi}'_{V_I}$ or the surface R4 of the formula $\bar{\varphi}'_{V_{II}}$.

Inasmuch as in the formulae given the objective components are designated by the Roman characters I, II, etc. and the corresponding surfaces of the components are designated by the arabic characters 1, 3, etc., they may be written as follows:

$$\bar{\varphi}'_{V_I} = \bar{\varphi}'_{V_2} = \bar{\varphi}_{F_1} + \bar{\varphi}_{F_2} \text{ and } \bar{\varphi}'_{V_{II}} = \bar{\varphi}'_{V_4} = \sum_{1}^{4} \bar{\varphi}_F$$

The focal length of the numerical embodiment given is equal to unity. The distance of the Gauss image plane from the image vertex of the last lens is designated by $p'_o$. The indicated refractive exponents correspond to the yellow ray whereas the color dispersion is designated by the Abbe letter $\nu$.

Relative aperture f2.9  $P_o = .8186$ $R1 = +\ .4323$
$\quad d1 = .05717 \quad n1 = 1.5890 \quad \nu_1 = 61.2$
$R2 = -\ 12.234$
$\quad \Delta1 = .00407$ air
$R3 = +\ .5424$
$\quad d2 = .04070 \quad n2 = 1.6375 \quad \nu_2 = 56.1$
$R4 = +\ .8521$
$\quad \Delta2 = .04884$ air
$R5 = -\ .7238$
$\quad d3 = .01647 \quad n3 = 1.6045 \quad \nu_3 = 37.8$
$R6 = +\ .3293$
$\quad \Delta3 = .08178$ air diaphragm space
$R7 = -\ 2.0391$
$\quad d4 = .02849 \quad n4 = 1.5145 \quad \nu_4 = 54.7$
$R8 = +\ .3905$
$\quad d5 = .07442 \quad n5 = 1.6025 \quad \nu_5 = 59.5$
$R9 = -\ .3935$ From the embodiment given we have, according to the data given in the copending application:

| $\nu$ | Height of incidence $h_\nu$ | Surface effect $\bar{\varphi}_{F_\nu}$ |
|---|---|---|
| 1. Surface | 1.00 00 00 | +1.36 25 84 |
| 2. Surface | .95 09 76 | +.04 57 83 |
| 3. Surface | .94 52 44 | +1.11 08 90 |
| 4. Surface | .88 26 32 | -.66 03 20 |
| 5. Surface | .79 18 47 | -.66 12 96 |
| 6. Surface | .77 95 51 | -1.43 11 93 |
| 7. Surface | .79 86 52 | -.20 15 09 |
| 8. Surface | .80 68 36 | +.18 18 20 |
| 9. Surface | .81 85 96 | +1.25 32 41 |

| $\nu$ | Rest effect $\bar{\varphi}_{V_\nu}$ | Rest effect $\bar{\varphi}'_{V_\nu}$ |
|---|---|---|
| 1. Surface | ±.00 00 | +1.36 25 84 |
| 2. Surface | +1.36 25 84 | +1.40 83 67 |
| 3. Surface | +1.40 83 67 | +2.51 92 57 |
| 4. Surface | +2.51 92 57 | +1.85 89 37 |
| 5. Surface | +1.85 89 37 | +1.19 76 41 |
| 6. Surface | +1.19 76 41 | -.23 35 52 |
| 7. Surface | -.23 35 52 | -.43 50 61 |
| 8. Surface | -.43 50 61 | -.25 32 41 |
| 9. Surface | -.25 32 41 | +1.00 00 |

Corresponding to the principles set forth in the copending application it follows from the embodiment given that the surface effect of the collective cemented surface in the positive outer member (IV) $\bar{\varphi}_{F_8} = +.181820$, and the rest effect $\bar{\varphi}'_{V_{III}}$ directed towards the last surface (R6) of the dispersing member (III) $\bar{\varphi}'_{V_6} = -.233552$, and it is clear that .181820 is greater than .233552:4. The rest effect $\bar{\varphi}'_{V_{II}}$ directed towards the last surface (R4) of the inner collective member (II) $\bar{\varphi}'_{V_4} = 1.858937$, the surface effect of the inner radius (R5) of the dispersing member (III) facing both of these collective members is $\bar{\varphi}_{F_5} = -.661296$, and finally the surface effect of the outer radius (R9) of the cemented collective lens (IV) facing the shorter radiation width is $\bar{\varphi}_{F_9} = +1.253241$. In addition, we have also for the two other ratios:

$\bar{\varphi}_{F_5} : \bar{\varphi}_{F_9} = .661296 : 1.253241 = .527670$ absolute value $\bar{\varphi}'_{V_I} : \bar{\varphi}_{F_9} = 1.858937 : 1.253241 = 1.483307$ Hence .527670 lies between the values ⅓ and 1, while 1.483307 lies between the values ⅔ and 2.

Furthermore, according to the present invention the rest effect $\bar{\varphi}'_{V_I}$ directed towards the last surface (R3) of the front lens (I) preceding the inner collective member (II) on the side of longer radiation width is $\bar{\varphi}'_{V_2} = +1.408367$, the rest effect $\bar{\varphi}'_{V_{II}}$ directed towards the last surface of the inner collective member (as previously recited) is $\bar{\varphi}'_{V_4} = +1.858937$, and, as claimed, 1.408367 is greater than 50 per cent of 1.858937.

I claim:

Photographic objective of four components in contact with the air, in which a single, uncemented and asymmetrical bi-concave dispersive lens is disposed behind two separate collective components located on the object side, while on the other side of this dispersive lens there is a cemented meniscus-shaped collective component, the collective cemented surface of which is concave toward the image side, has said cemented component having a convex outer surface toward the image side and the total focal length of the dispersive component being between 40% and 80% of the focal distance of the entire objective, the refractive power of the two separate collective components being such that the rest effect ($\bar{\varphi}_{V_I}$) toward the front components (I) consisting of the algebraic sum of the surface effects ($\Sigma \bar{\varphi}_F$) each individual one of which ($\bar{\varphi}_{F_I}$) is equal to the product of the auxiliary radiation incidence height ($h_i$), the refraction difference ($n'_i - n_i$) and radii reverse value ($1 : r_i$), whereby the surface index is then designated by $i$ amounts to between 50% and 95% of the rest effect ($\varphi_{V_{II}}$) toward the collecting component (II) next to the front lens, whereby also the focal length of the first collective component (I) is smaller per se than the focal length of the entire objective.

ALBRECHT WILHELM TRONNIER.